United States Patent [19]

Fujan

[11] Patent Number: 5,085,520
[45] Date of Patent: Feb. 4, 1992

[54] NOSE CONE BEARING ARRANGEMENT

[75] Inventor: Steven J. Fujan, Sand Springs, Okla.

[73] Assignee: Terex Corporation, Green Bay, Wis.

[21] Appl. No.: 624,968

[22] Filed: Dec. 10, 1990

[51] Int. Cl.⁵ .............................................. F16C 23/04
[52] U.S. Cl. ................................... 384/203; 384/206; 384/209
[58] Field of Search ............... 384/192, 202, 203, 205, 384/206, 208, 209, 299, 434, 130, 147, 151–153, 908; 280/688

[56] References Cited

U.S. PATENT DOCUMENTS

| | | | |
|---|---|---|---|
| 2,952,144 | 9/1960 | Holmes, Jr. | 384/203 X |
| 3,744,859 | 7/1973 | Ringel | 384/206 |
| 3,806,158 | 4/1974 | Casey | 384/202 X |
| 3,922,040 | 11/1975 | Carter | 384/209 |
| 4,056,478 | 11/1977 | Capelli | 384/203 X |
| 4,076,347 | 2/1978 | Meek | 384/908 X |
| 4,629,211 | 12/1986 | Modglin et al. | 280/688 |
| 4,718,780 | 1/1988 | Trudeau | 384/202 X |

Primary Examiner—Thomas R. Hannon
Attorney, Agent, or Firm—Head and Johnson

[57] ABSTRACT

A nose cone bearing arrangement for securing an axle box to a frame cross-tube of an off-road machine is provided. The axle box has an internal cylindrical bearing cavity therein. A metal double truncated spherical bearing surface is formed on and encompasses a truck frame cross-tube. A toroidal oil impregnated plastic bearing member having an external cylindrical surface is received within and conforms to the axle box internal bearing cavity. The plastic bearing has an internal concave bearing surface that engages the cross-tube spherical bearing surface.

10 Claims, 2 Drawing Sheets

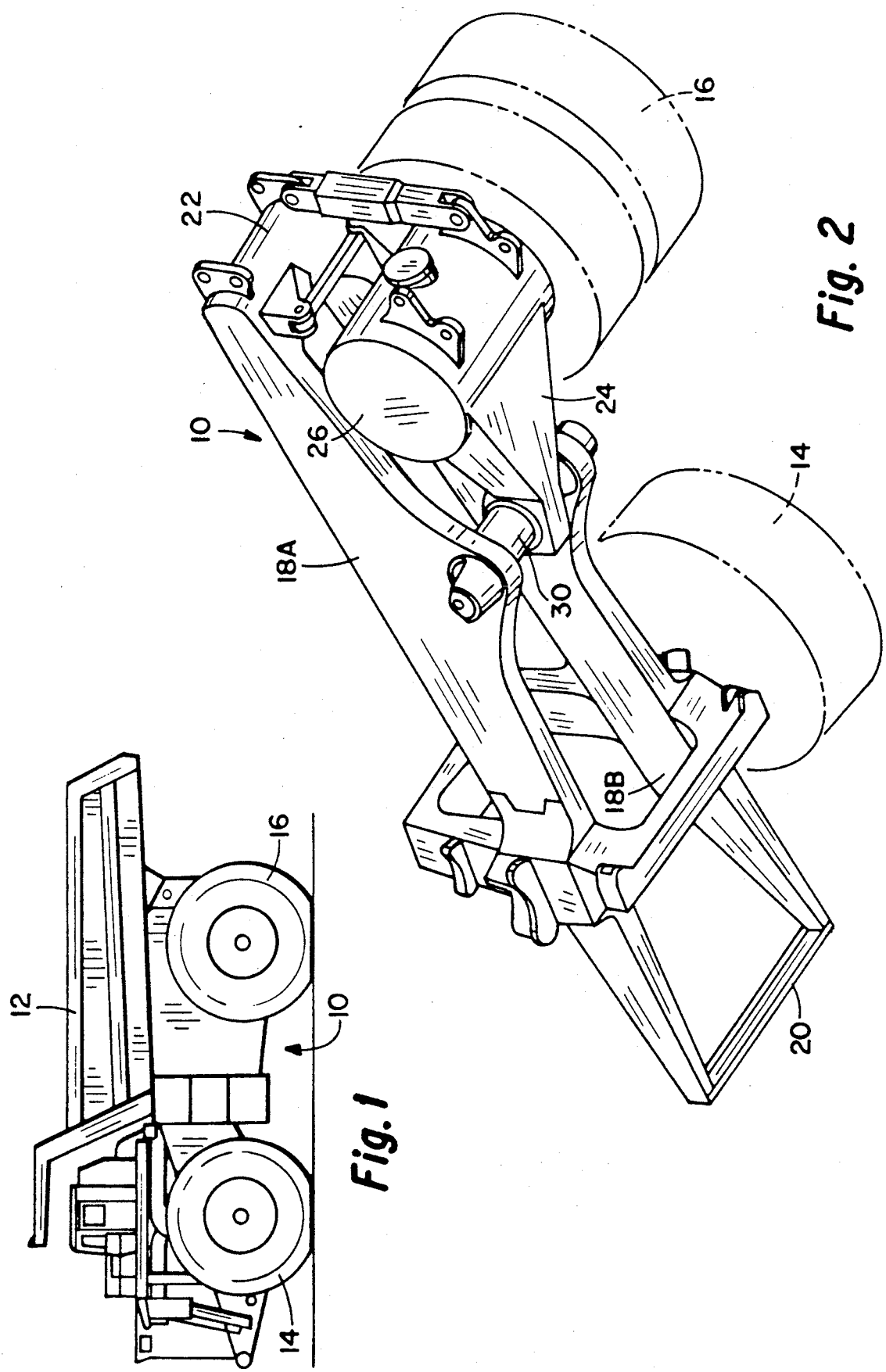

NOSE CONE BEARING ARRANGEMENT

CROSS REFERENCE TO RELATED PATENT

This improved bearing arrangement for mounting an axle box to a frame cross-tube of an off-road machine is related and is an improvement of the concept for a frame and axle for heavy duty trucks as disclosed in U.S. Pat. No. 4,629,211, dated Dec. 16, 1986.

SUMMARY OF THE INVENTION

U.S. Pat. No. 4,629,211 discloses a support structure for a heavy-load carrying off-road machine. The support structure includes a frame having a rigid structural cross-member termed a "cross-tube". A spherical bearing is formed on the cross-tube intermediate the ends thereof. The spherical bearing is thereby supported to the machine frame in an imaginary vertical plane drawn through the longitudinal axis in the direction of motion of the machine when the machine is traveling in a straight line.

An axle box is provided having opposed ends, one end being used to support the machine drive wheels. The opposite end of the axle box, which may be termed the "pivoted end", has a bearing surface therein. The axle box bearing surface encompasses the cross-tube spherical bearing surface. The basic objective of this disclosure is to provide an improved bearing arrangement for mounting the axle box to the frame cross-tube of an off-road machine.

Heretofore, the bearing which has typically been used to support an axle box to a frame cross-tube of a heavy-load carrying off-road machine has been formed in the way sleeve bearings have been customary formed for many years, that is, a metal bearing, such as of lead, having one surface which closely conforms to the cross-tube spherical bearing surface. While the use of lead or other metal bearings function satisfactory, some problems are inherent. First, with any kind of metal bearing where one metal surface moves against another metal surface, it is imperative that lubrication be provided. If lubrication becomes deficient and metal surfaces rub against each other, particularly in situations wherein very heavy load pressures are applied between the surfaces, as occurs in large off-road heavy load carrying machines, very rapid wear and deterioration of the bearing surfaces occur. For this reason, the bearing arrangements heretofore employed have required careful lubrication maintenance with the constant possibility that inadvertent failure to properly lubricate the surface could result in rapid bearing deterioration.

Another problem with the existing types of bearing arrangements for attaching an axle box to a frame cross-tube wherein the axle box has an internal cylindrical bearing surface and the cross-tube an external convexed spherical bearing surface, is that it is difficult to retain the bearing in a fixed orientation relative to the axle box cylindrical internal bearing surface. Stating it another way, it is difficult to secure a metal bearing in such a way that the bearing relationship always takes place between the internal concave spherical surface of the bearing with the cross-tube external spherical bearing surface rather than between the bearing external cylindrical surface and the cross-tube internal cylindrical bearing surface. In order to lubricate the bearing surface between the external spherical surface of a cross-tube and the internal spherical surface of a metal bearing flow passageways must be provided in the axle box between a grease zert and the bearing surfaces. When slippage occurs between a metal bearing and the axle box internal cylindrical bearing surface the grease flow passageway can be obscured, making lubrication of the bearing difficult or in some situations impossible.

The present disclosure is intended to overcome some of the problems and difficulties above mentioned by providing an effective, long-life bearing arrangement for mounting an axle box to a frame cross-tube of an off-road machine.

A particular advantage of the improved bearing arrangement of the present disclosure is that it eliminates the necessity of lubrication. Another advantage of the bearing arrangement of the present disclosure is that rotational displacement of the bearing relative to the axle box internal cylindrical bearing surface is not detrimental to the operation of the bearing.

The advantages of the present disclosure will be more fully understood with reference to the following description and claims, taken in conjunction with the attached drawings.

DESCRIPTION OF THE DRAWINGS

FIG. 1 is an elevational view of a typical large, off-road machine used for hauling heavy loads and which machine typically includes an axle box for securing the rear wheels to the machine frame and in which the axle box is pivotally secured to a croos-tube affixed to the machine frame.

FIG. 2 is an enlarged isometric view of a frame of the machine of FIG. 1 showing the frame having a cross-tube and an axle box pivotally secured to the cross-tube. The view is taken from below the machine frame. The axle box is used to support the rear wheels of the machine. In FIG. 2 dual rear wheels are shown in phantom view secured to the axle box on the right side of the machine, and a machine front wheel is shown in phantom view secured to the machine right side. Wheels which are employed on the machine left side are not shown to more clearly reveal details of the frame, including the axle box, the frame cross-tube and the means of mounting the axle box to the frame cross-tube.

DESCRIPTION OF THE PREFERRED EMBODIMENTS

Figure 3:
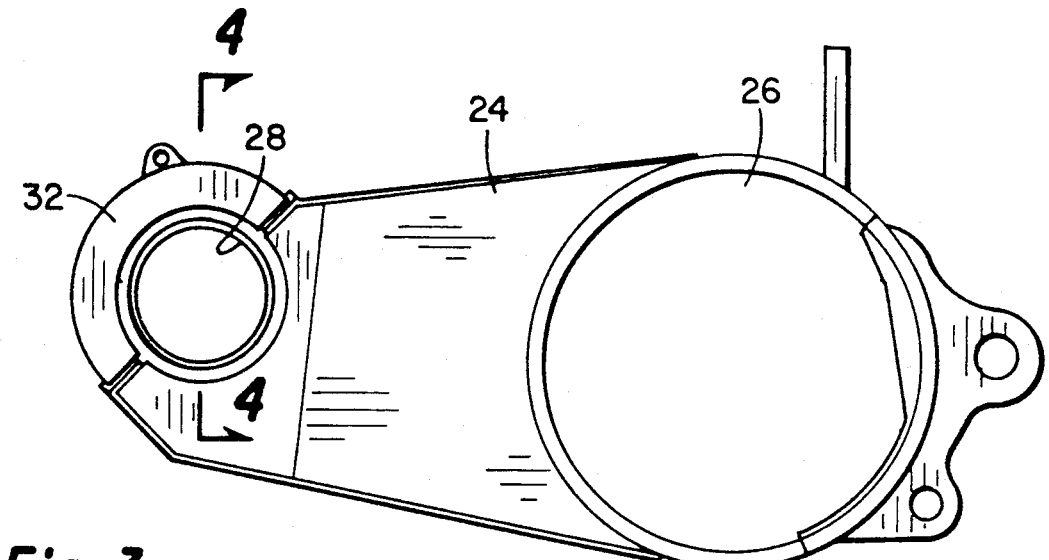
FIG. 3 is an elevational side view of an axle box as employed with the frame of FIG. 2.

Referring to the drawings and first to FIG. 1, an elevational view of a typical off-road machine for carrying heavy loads is illustrated. The machine includes a frame generally indicated by the numeral 10, which supports a dump body 12, the body being shown in the haul position. The machine frame is supported by forward wheels 14 and rearward wheels 16.

Referring now to FIG. 2, frame 10 of the machine of FIG. 1 is shown in an isometric lower view. The frame includes longitudinal structural members 18A and 18B which forms the frame superstructure. Frame 10 has a forward end 20 and a rearward end 22.

Rearward wheels 16 (only the right-hand set of dual wheels being illustrated in FIG. 2) are pivotally supported to frame 10 by means of an axle box 24. The machine of FIGS. 1 and 2 is the type utilizing electric drive. The axle box, which is shown in more detail in FIG. 3, includes a large diameter cylindrical rear axle housing 26 that typically includes electric drive motors (not shown) having axles that receive rear wheels 16.

The axle box 24 has, at the forward end thereof, an internal cylindrical bearing cavity 28 having fixed end surfaces 28A and 28B and the cavity pivotally receives a frame cross-tube 30. As shown in FIG. 2, the cross-tube 30 is supported at opposed ends by the frame superstructure longitudinal members 18A and 18B.

The structure described to this point is of known configuration, such as shown in U.S. Pat. No. 4,629,211. The objective of this disclosure is to provide an improved bearing arrangement for pivotally supporting axle box 24 to frame cross-tube 30.

As seen in FIG. 3 axle box 24 has, at the forward end thereof, a removable pivot cap portion 32 that is supported to the forward end of axle box 24 by means of bolts (not shown) in the manner described in U.S. Pat. No. 4,629,211.

Figure 4:
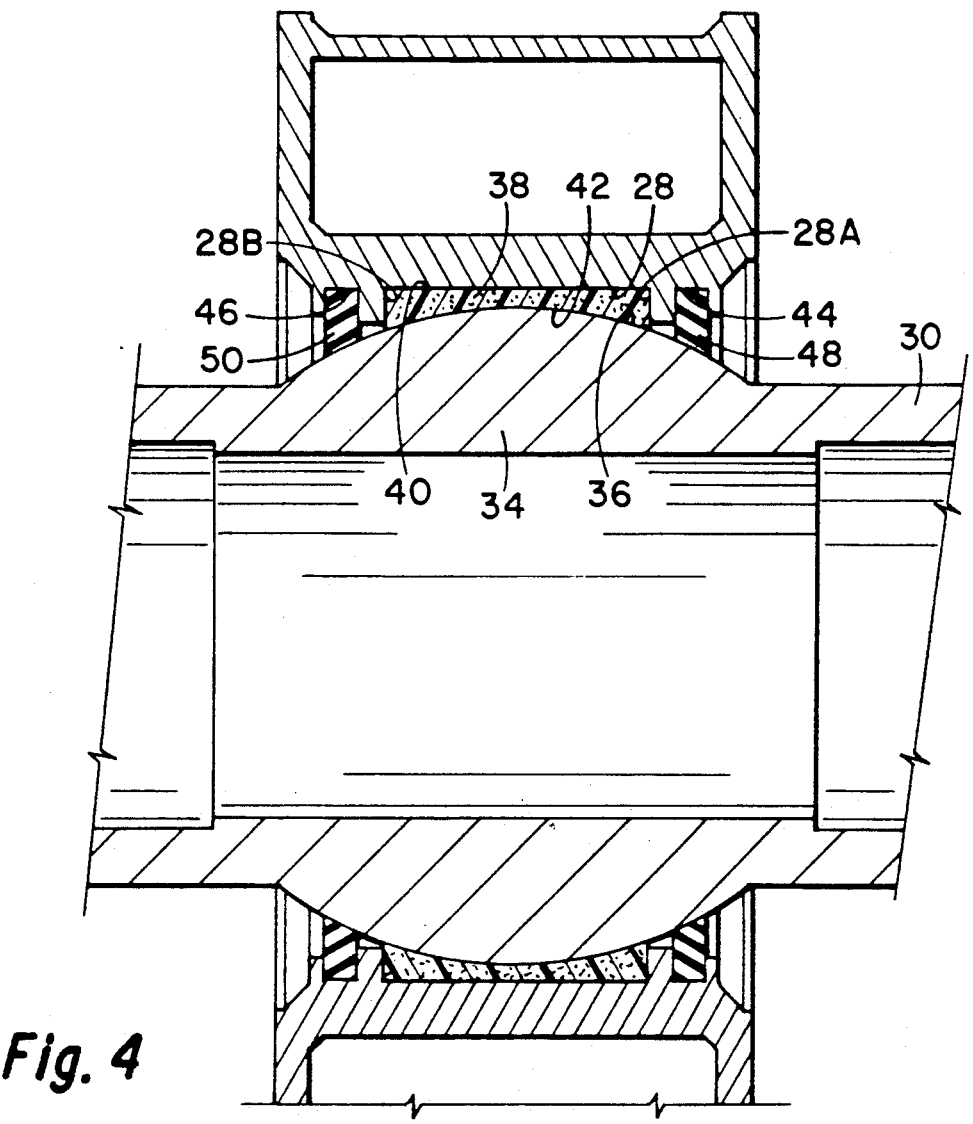
FIG. 4 is an enlarged cross-sectional view taken along the line 4—4 of FIG. 3 showing the improved bearing arrangement for pivotally supporting the axle box to the frame cross-tube.

Referring to FIG. 4, the bearing that pivotally supports axle box 24 to the machine cross-tube 30 is illustrated. Cross-tube 30 has, intermediate the ends thereof, an enlarged diameter spherical bearing portion 34. This spherical bearing portion 34 may be integrally formed with the cross-tube as illustrated or may be formed as a separate element that is positioned on and affixed in position on the cross-tube. In any method of construction spherical bearing portion 34 provides a double truncated spherical bearing surface 36. Bearing surface 36 is defined as "double truncated" in that it is a portion of a sphere, as geometrically defined by a spherical surface, cut-off by opposing parallel planes at the point of junction of the spherical surface with the surface of cross-tube 30.

The axle box has, as previously indicated, a cylindrical bearing cavity 28 that is, in the arrangement illustrated in FIG. 3, formed in part by the removable pivot cap 32.

Received within cylindrical bearing cavity 28 between fixed end surfaces 28A and 28B is a plastic bearing member 38. This plastic bearing member is preferably in the form of a bifurcated toroidal member having, in the toroidal position, an external cylindrical surface 40 and an internal double truncated circumferential concave spherical bearing surface 42 which matches with and fits against the cross-tube spherical convex bearing surface 36.

In assembly of axle box 24 to cross-tube 30, pivot cap 32 is removed and the cylindrical bearing cavity 28 of the axle box is fitted with one-half of the plastic bearing member 38. The pivot cap portion of the cylindrical bearing cavity 28 is then fitted with the other half of the plastic bearing member 38. The pivot cap with the plastic bearing is then bolted into position on axle box 24 so that the cylindrical bearing cavity 28 having the toroidal plastic bearing member 38 therein is secured and locked in position about the cross-tube spherical bearing surface 36.

In previous arrangements a metal bearing, such as made of babbitt, bronze or other bearing forming materials, has been used between cross-tube 30 and axle box 24. However, the use of plastic bearing member 38 has many advantages. In the preferred arrangement plastic bearing member 38 is oil impregnated, such as oil impregnated nylon. When material of this type is employed, no lubrication is required between bearing surfaces 36 and 42. Since lubrication is not required, there are no lubrication passageways to get out of alignment. For this reason, if plastic bearing member 38 rotates within the cylindrical bearing cavity 28 such is of no consequence. That is, a bearing surface can exist between the external cylindrical surface of the plastic bearing member 38 and the cylindrical bearing surface 28 without serious detriment to the function of the bearing, however, in the preferred arrangement the bearing surfaces 36 and 42 are smoothly finished so that the bearing action will preferentially take place between these surfaces.

In the illustrated embodiment of FIG. 4, there is provided in the internal cylindrical portion of axle box 24 a first circumferential internal groove 44 spaced adjacent to but slightly away from bearing cavity 28 that receives plastic bearing 38. In like manner, a second groove 46 is formed on the opposite side of the bearing cavity. Grooves 44 and 46 receive a toroidal elastomeric wiper member 48 and 50 respectively. The toroidal wiping members 48 and 50 are preferably bifurcated so that in the assembly process one-half can be fitted in the forward end of axle box 24 and the other half within pivot cap 32.

The toroidal elastomeric wiper members serve to help keep the cross-tube spherical bearing surface 36 free of dust and dirt to thereby prolong the life of plastic bearing member 38. While such members may be formed of different materials, a preferred material is closed cell neoprene.

Plastic bearing 38, particularly in combination with opposed toroidal wiping members 48 and 50, forms an improved arrangement for supporting an axle box to a cross-tube of a large off-road machine. Decrease maintenance is obtained due to the elimination of lubrication to thereby achieve reduced cost of operation of an off-road machine.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An improved bearing arrangement for mounting an axle box to a frame cross-tube of an off road vehicle, the axle box having an internal cylindrical bearing cavity therein and an internal circumferential groove therein spaced from and to both sides of said internal cylindrical bearing cavity, the bearing arrangement comprising:

a double truncated spherical bearing surface formed on and encompassing a truck frame cross-tube;

a toroidal plastic bearing member having an external cylindrical surface receivable within and conforming to said axle box internal cylindrical bearing cavity and having a circumferential internal concave bearing surface engaging with and conforming to said cross-tube spherical bearing surface; and a toroidal elastomeric wiper member received in each of said grooves, each wiper member having an inner circumferential surface engaging with and conforming to a circumferential portion of said frame cross-tube spherical bearing surface.

2. A bearing arrangement according to claim 1 wherein said axle box is bifurcated in a plane of the bearing cavity cylindrical axis providing a removable axle box pivot cap portion, the cap portion thereby having one half of said internal cylindrical bearing cavity therein, and wherein said plastic bearing member is bifurcated in a plane of its toroidal axis.

3. A bearing arrangement according to claim 1 wherein said plastic bearing member is oil impregnated.

4. A bearing arrangement according to claim 1 wherein said toroidal elastomeric wiper members are formed of closed cell neoprene.

5. A bearing arrangement according to claim 1 wherein said axle box is bifurcated in a plane of the bearing cavity cylindrical axis providing a removable axle box pivot cap portion, the cap portion thereby having one half of said internal cylindrical bearing cavity therein, and wherein said plastic bearing member is bifurcated in a plane of its toroidal axis, and wherein each said elastomeric wiper member is bifurcated in a plane of its toroidal axis.

6. An improved bearing arrangement for mounting an axle box to a frame cross-tube of an off-road vehicle comprising:

an axle box pivot end portion having one half of an internal cylindrical bearing cavity therein;

an axle box pivot end cap member attachable to and detachable from said axle box pivot end portion, the cap member having one half of an internal cylindrical bearing cavity therein, providing, when the cap portion is attached to said axle box pivot end portion, an internal cylindrical bearing cavity having integral opposed fixed end surfaces;

a frame cross-tube;

a metal double truncated spherical bearing surface encompassing said cross-tube;

a bifurcated toroidal plastic bearing member having, when assembled into a toroidal, an external cylindrical surface and a cylindrical internal concave surface, one half of the plastic bearing member being receivable within said axle box pivot end internal cylindrical bearing surface between said opposed fixed end surfaces and the other half being receivable within said cap member circumferential bearing cavity between said opposed fixed end surfaces and, with said end cap attached to said axle box pivot end portion, said circumferential internal concave surfaces engage and conform to said frame cross-tube spherical bearing surface.

7. An improved bearing arrangement according to claim 6 wherein said axle box pivot end portion and said axle box cap portion each have therein bifurcated portions of internal grooves spaced from and to both sides of said circumferential bearing cavity and including a pair of bifurcated toroidal elastomeric wiper members, one such bifurcated wiper member being received in each such said bifurcated portions of said grooves in said axle box pivot end bearing portion and said cap member, and said elastomeric wiper members each having an inner surface engaging said frame cross-tube spherical bearing surface when said cap member is affixed onto said axle box pivot end portion.

8. A bearing arrangement according to claim 7 wherein said elastomeric wiper members are bifurcated in a plane of the toroidal axis thereof.

9. A bearing arrangement according to claim 7 wherein said bifurcated toroidal elastomeric wiper members are formed of closed cell neoprene.

10. A bearing arrangement according to claim 6 wherein said bifurcated plastic bearing members are formed of oil impregnated plastic.

* * * * *